June 23, 1925.
S. K. DENNIS
1,543,603
PLANTER DRIVE MECHANISM
Filed April 30, 1923
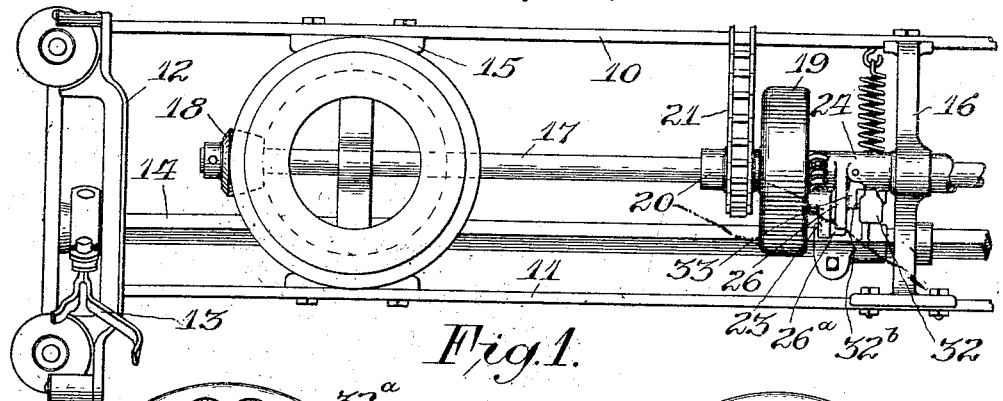
Fig. 1.
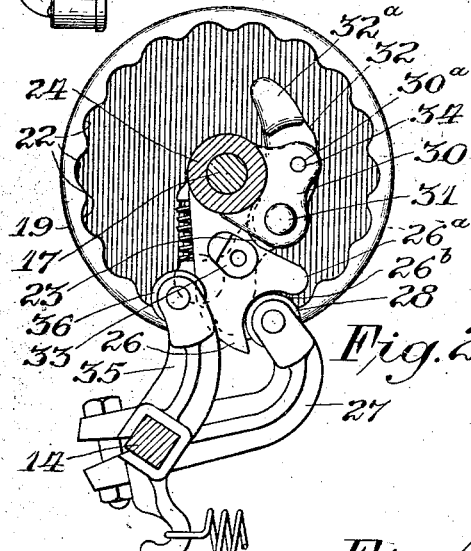
Fig. 2.
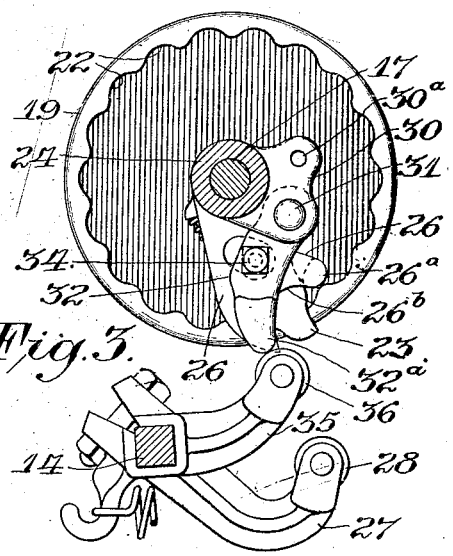
Fig. 3.
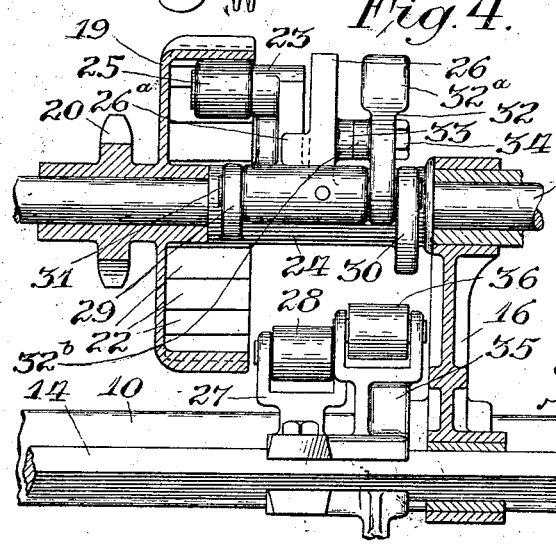
Fig. 4.
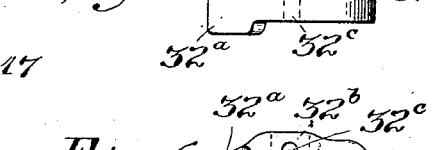
Fig. 5.
Fig. 6.
Inventor:
Samuel K. Dennis,
By H.P. Doolittle
Atty.

Patented June 23, 1925.

1,543,603

UNITED STATES PATENT OFFICE.

SAMUEL K. DENNIS, OF CHICAGO, ILLINOIS, ASSIGNOR TO INTERNATIONAL HARVESTER COMPANY, OF CHICAGO, ILLINOIS, A CORPORATION OF NEW JERSEY.

PLANTER DRIVE MECHANISM.

Application filed April 30, 1923. Serial No. 635,539.

*To all whom it may concern:*

Be it known that I, SAMUEL K. DENNIS, a citizen of the United States, residing at Chicago, in the county of Cook and State of Illinois, have invented certain new and useful Improvements in Planter Drive Mechanism, of which the following is a full, clear, and exact specification.

This invention relates to drive mechanism for corn planters and is directed to improvement in the intermittent drive mechanism ordinarily employed, through the action of which the seed dispensing mechanism is periodically driven and a predetermined number of seeds dropped at fixed intervals.

The object of the invention is to provide an auxiliary device of simple form, in connection with the clutch mechanism, by the action of which the intermittent driving action of the clutch may be changed to a continuous drive and the planting action thereby changed from hill dropping to drilling.

With this main object in view, the invention resides in combination with certain parts comprising the intermittent drive of additional elements, of novel form, for converting the intermittent drive into a continuous drive, as hereinafter more particularly described and claimed.

Referring to the drawings accompanying the application—

Fig. 1 is a plan view of a lateral half of the runner frame of a planter showing the drive mechanism including the invention;

Fig. 2 is a side view with the parts comprising the invention out of operation;

Fig. 3 is a similar view with the parts in operating position;

Fig. 4 is a longitudinal sectional view through the drive mechanism; and

Figs. 5 and 6 are detail views from the top and side of the auxiliary arm forming part of the novel structure.

In the present instance, the invention is illustrated in connection with the runner frame of a planter constructed in the usual manner and comprising, essentially, the transverse members 10 and 11 united at each end by the head pieces 12 in which the check forks 13 on the rock shaft 14 work. The frame bars are also united by cross pieces or brackets 15 and 16 which are provided with bearings in which the seed plate driving shaft 17 and the check shaft, or rock shaft, 14 are journaled. The bracket 15 carries the usual seed dispensing device which is driven by the pinion 18 on shaft 17. The drive mechanism for the shaft 17 comprises the dish-shaped clutch member 19 having a drive pinion 20 formed integrally with it and continuously driven from the axle of the planter by a sprocket chain 21, these parts being free to turn on shaft 17. The rim of clutch member 19 is provided with internal notches or depressions 22 and a spring pressed pawl 23 pivoted on a sleeve member 24, secured on shaft 17, carries a roller 25 in position to engage the notches 22. The sleeve 24 is formed with an integral radially extending stop arm 26, positioned adjacent the pawl 23 and provided with means, such as a lug 26$^a$, for limiting the inward swing of that pawl. Stop arm 26 is formed with a depression 26$^b$ beyond which the end of pawl 23 normally projects and a trip arm 27 fixed to rock shaft 14 has its end provided with a roller 28 adapted to engage the projecting end of pawl 23 and be received in the depression 26$^b$ when the clutch reaches throw-out position. Withdrawal of arm 27 under action of the check wire permits pawl 23 to spring back into engagement with clutch member 19 and the mechanism then makes a complete revolution and is again disengaged by the action of trip arm 27. The parts so far described are those well known in this type of mechanism and form no part of my present invention except as they cooperate therewith.

The sleeve 24, which is fixed on shaft 17, is provided with ears 29 and 30 between which there is pivoted a pintle or shaft 31 carrying the pawl 23 heretofore described. For the purposes of my invention, I pivot on one end of pintle 31 adjacent the inner side of the ear 30 an auxiliary pawl or arm 32. This arm has its outer end flattened to form an engaging head 32$^a$ and at its middle it has a boss 32$^b$ in which there is a transverse opening 32$^c$. The stop arm 26 is formed with a boss 33 which has a threaded opening therein and when arm 32 is swung around on its pivot on pintle 31 so as to project outwardly, the boss 32$^b$ will register with the boss 33 on arm 26 and a screw threaded pin 34 can then be passed through aperture 32$^c$ and the arm 32 fastened in position as seen in Figs. 3 and 4. This represents the operative position of the arm 32. As provision for adjusting it to inoperative position, the ear 30 is made wide and formed with a threaded aperture 30ᵃ located so as to register with the aperture 32ᶜ in arm 32 when the arm is swung inwardly, as in Fig. 2, when the screw threaded pin 34 can be inserted in the openings and the arm fixed in inactive position. For cooperation with arm 32, a secondary trip arm 35 is secured on rock shaft 14 adjacent arm 27 and in the plane of rotation of the arm 32. This arm 35 carries a roller 36 which is positioned somewhat in advance of the roller 28 on arm 27 and is adapted to be engaged by the head 32ᵃ on arm 32 when that arm is fixed in operative position.

With the construction above described the position of pawl or arm 32 determines whether the drive mechanism will act periodically, as in hill dropping, or continuously, as in drilling. When arm 32 is swung around and fixed in operating position, as in Figs. 3 and 4, each revolution of the clutch member 19 and sleeve 24 will bring head 32ᵃ on arm 32 into engagement with the roller 36 on arm 35, thereby rocking shaft 14 and with it arm 27 and preventing engagement of roller 28 with pawl 23 as would otherwise occur. Therefore, the drive is not interrupted and the shaft 17 becomes continuously driven. Obviously, when arm 32 is swung inwardly, as in Fig. 2, it will not engage roller 36 and the clutch mechanism will drive the shaft 17 periodically in the usual manner.

It will be evident from the above description that I have devised a simple and inexpensive construction for the purpose set forth and that certain modifications thereof are possible, within the scope of the following claims, without departing from the invention.

I claim as my invention:

1. In a check-row planter having intermittent drive mechanism comprising a constantly rotating driving member, an intermittently rotated driven member, and a periodically actuated trip member controlling the intermittent drive; the combination with the driven member of an auxiliary arm, a second trip member movable jointly with said first trip member and positioned in the plane of rotation of said arm, and means for adjusting said arm to and from a position for engaging said second trip member.

2. In a check-row planter having intermittent drive mechanism comprising a constantly rotating driving member, an intermittently rotated driven member, and a periodically actuated trip member controlling the intermittent drive; the combination of a pivotally mounted arm on the driven member, means for fixing said arm in either of two positions in one of which it projects radially, and a secondary trip member adapted to be engaged by said arm when fixed in projecting position.

3. In a check-row planter having intermittent drive mechanism comprising a constantly rotating driving member, an intermittently rotated driven member, and a periodically actuated trip member controlling the intermittent drive; the combination with the driven member of an auxiliary arm, means for adjusting said arm to and from a working position, and means for causing said arm, when in working position, to actuate said trip member.

4. In a check-row corn planter, the combination with intermittently actuated driving mechanism for the seed plates and the trip control means therefor, of means operated by said driving mechanism for prematurely actuating the trip control, thereby preserving a constant drive, and means for putting said actuating means in and out of operation.

5. In a check-row corn planter, the combination with the intermittently actuated driving mechanism for the seed plates and the periodically actuated control means therefor, of supplemental periodically acting means for actuating said control means in advance of its normal period and adapted to be put in operation to prevent periodical disconnection of the drive.

In testimony whereof I affix my signature.

SAMUEL K. DENNIS.